United States Patent [19]

Gilmour et al.

[11] Patent Number: 5,172,230

[45] Date of Patent: Dec. 15, 1992

[54] APPARATUS FOR RECORDING AND READING AN IMAGE ON A MEDIUM AND DETECTING ERRORS AND MEDIA DEFECTS

[75] Inventors: Hugh S. A. Gilmour, Rochester; David C. Shuman, Victor, both of N.Y.

[73] Assignee: Eastman Kodak Company, Rochester, N.Y.

[21] Appl. No.: 634,636

[22] Filed: Dec. 27, 1990

[51] Int. Cl.$^5$ .............................................. H04N 9/79
[52] U.S. Cl. ....................................... 358/332; 358/244
[58] Field of Search ............... 358/332, 342, 310, 906, 358/909, 244, 244.1, 244.2, 75, 78, 76, 406; 369/125, 116, 32, 44.37, 44.38, 100, 107, 108; 360/33.1, 35.1; 356/237, 404; 250/226; 355/50, 208, 209

[56] References Cited

U.S. PATENT DOCUMENTS

| | | | |
|---|---|---|---|
| 1,449,897 | 9/1976 | McMann et al. | 358/332 |
| 2,983,784 | 5/1961 | Razdon | 358/332 |
| 3,198,067 | 8/1965 | Gabor | 358/332 |
| 3,612,759 | 10/1971 | Nelson et al. | 358/332 |
| 3,794,755 | 2/1974 | Metzger | 358/332 |
| 3,928,719 | 12/1975 | Sasabe et al. | 358/332 |
| 3,943,559 | 3/1976 | d'Anria et al. | 358/332 |
| 4,087,176 | 5/1978 | Nigg | 358/332 |
| 4,481,542 | 11/1984 | Goldberg | 358/332 |
| 4,729,032 | 3/1988 | Nishiyama et al. | 358/332 |
| 4,827,434 | 5/1989 | Hanan et al. | 358/332 |
| 5,010,414 | 4/1991 | Clapp | 358/323 |
| 5,034,292 | 7/1991 | Gilmour et al. | 430/3 |

OTHER PUBLICATIONS

Toshio Motoki and Yokio Sughira, *Direct Recording onto Color Print Film by Laser beam for color Television Signal*, Jul. 1976, 2–10.

Milton S. Kiver, *Color Television Fundamentals*, 1955, pp. 1–18.

Primary Examiner—Tommy P. Chin
Assistant Examiner—Thai Tran
Attorney, Agent, or Firm—Robert L. Randall

[57] ABSTRACT

Apparatus is disclosed for recording and reading a color image formed on a receiving medium such as a film coated with a blue metastable colloidal silver. Upon application of heat to selected areas of the coating, the blue silver turns yellow to form an image. In a record mode, a modulated beam from a diode laser is scanned onto the receiving medium to form an image. In a read mode, a diode laser beam containing two different wavelengths of radiation is scanned across an image on the recording medium. In order to detect errors in the image, a detector senses the two wavelengths at each pixel and produces signals indicative of the densities of the yellow and blue in the pixel. Signal processing means is adapted to determine valid data points from the two signals.

10 Claims, 3 Drawing Sheets

APPARATUS FOR RECORDING AND READING AN IMAGE ON A MEDIUM AND DETECTING ERRORS AND MEDIA DEFECTS

Reference is made to U.S. patent application, Ser. No. 07/634,621, entitled "A Method for Recording and Reading An Image," filed in the names of Gilmour et al. on even date herewith; this application is assigned to the assignee of the present invention.

BACKGROUND OF THE INVENTION

1. Field of the Invention

This application relates to an apparatus for recording and reading an image, and more particularly, to such apparatus which is adapted to record and read a multicolor image.

2. Description of the Prior Art

In optical digital data recording, the recording medium can be a major contributor to signal errors. Missing or spurious signals induced by media defects cause data loss or contamination of the recorded information. Consequently, error detection and correction (EDAC) capability is incorporated into recording and playback systems. Such capability is usually in the form of software programs to encode and decode signals. During the recording phase, redundancy is built in by signal coding. During playback, the signal is verified or corrected by a deciphering code.

The proportion of a recording medium which is dedicated to error correction can be significant; for example, thirty percent is not unusual. Higher redundancy is required if the medium is imperfect, or if a very low error content is needed. Bit error rates of one in $10^{13}$ or less are sought in some applications. With present technology, optical media can not be manufactured to that degree of perfection.

The cost of EDAC is high not only in terms of the data storage density but also in terms of the data processing time and the complexity of the recording and decoding devices. Clearly, a system which can discriminate between recorded data and media defects offers an advantage. The benefits of such a system would include lower bit error rates and less redundancy which would result in higher data storage density.

SUMMARY OF THE INVENTION

It is an object of the present invention to overcome the problems discussed above in the prior art and to provide improved apparatus for the recording and reading of an image.

In accordance with one aspect of the invention, there is provided apparatus for reading an image on an image-bearing medium, the image being formed from a plurality of colors, each pixel in the image containing the colors in a predetermined relationship, the apparatus comprising: a source of radiation for directing radiation containing a plurality of wavelengths onto the medium; detector means for sensing each of the wavelengths at each pixel of the image and for providing signals representative of the densities of the colors in the pixel; and signal processing means for processing the signals from the detector means, the signal processing means including means for determining the relationship of the colors in each of the pixels and for providing an output indicative of whether the information in the pixel is valid.

In one embodiment of the present invention, a recording medium in the form of a web is supported for movement in a page scan, or cross-scan, direction. The medium can be, for example, a film having a blue colloidal silver coating. A yellow image is formed on the blue coating, and there is a predetermined relationship between the blue and the yellow in each pixel of the image. In a record mode, a galvanometer scans a laser beam across the recording medium in a scan direction. A diode laser, which is driven in accordance with an information signal, supplies the laser beam to the galvanometer through a collimator lens and beam shaping optics.

In a read mode, an unmodulated beam of radiation from the diode laser is divided into two different wavelengths of radiation and the dual-wavelength beam is directed to the galvanometer. The galvanometer scans the beam across a recording medium having a color image recorded thereon. After the beam passes through the recording medium, the beam is intercepted by a dual-wavelength detector which provides signals representative of the densities of radiation in the two wavelengths. The signals are directed to signal-processing means which produces a signal indicative of whether each picture element or pixel in the image is valid information.

A principal advantage of the present invention is that errors in a recording medium can be detected without using large areas of the recording medium for error correction. A further advantage is that error detection in an optical recording system can be performed without elaborate software schemes for coding and decoding the data. The present invention is particularly suitable for producing an optical recording of binary data which is relatively error free.

Other features and advantages will become apparent upon reference to the following description of the preferred embodiment when read in light of the attached drawings.

DESCRIPTION OF THE PREFERRED EMBODIMENT

Figure 1:
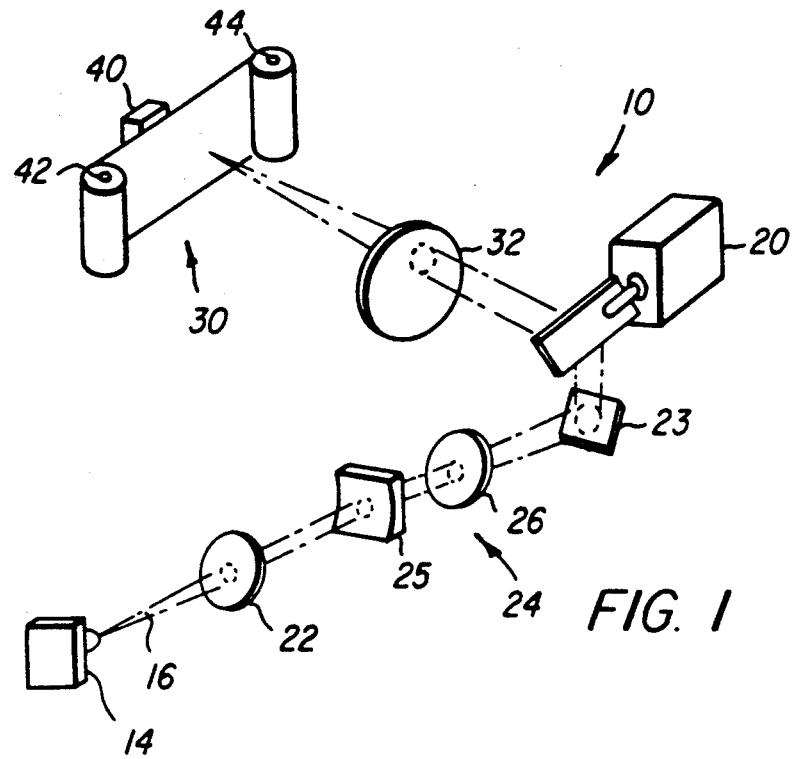
FIG. 1 is a schematic perspective view of the apparatus of the present invention.
Figure 2:
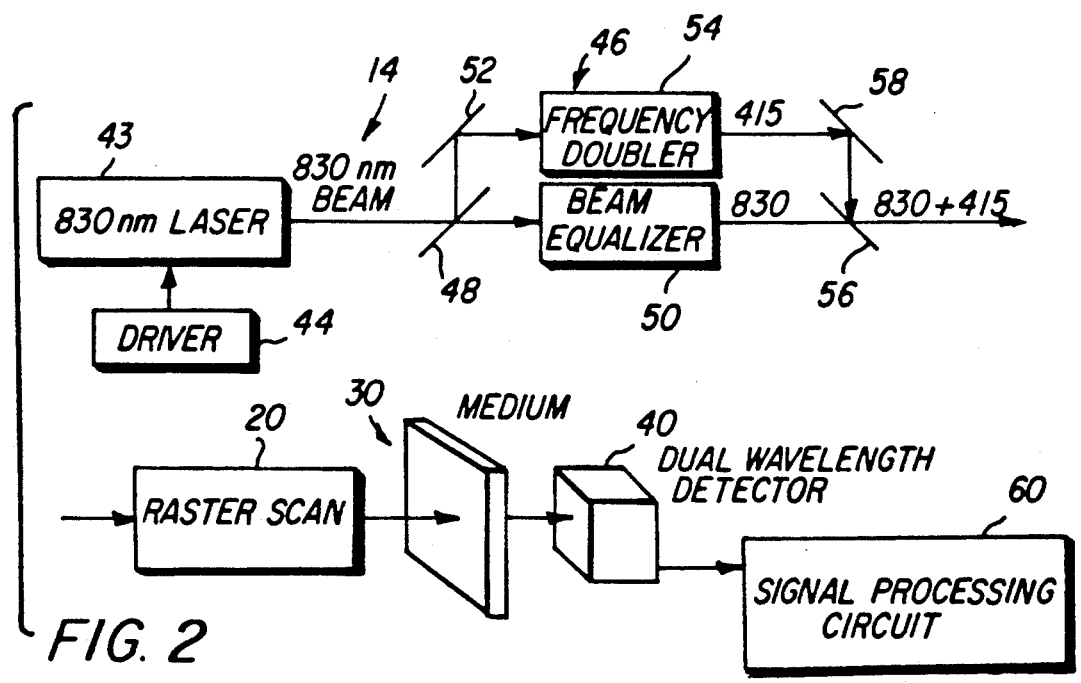
FIG. 2 is a schematic representation showing elements of the apparatus of the present invention which are used in the read mode.

With reference to FIG. 1, there is shown apparatus 10 constructed in accordance with the present invention. Apparatus 10 comprises a source of radiation 14 which produces a beam of radiation 16 that is modulated in accordance with an information signal. Beam 16 is directed to a galvanometer 20 through a collimating lens 22, beam shaping optics 24, and a turning mirror 23. Beam shaping optics 24 includes a pair of cylindrical lenses 25 and 26. Galvanometer 20 is adapted to scan the beam onto a receiving medium 30. The beam 16 from galvanometer 20 passes through an f-θ lens 32 which functions in a well-known manner to maintain a flat field and a constant velocity of the scanned spot on the recording medium.

Apparatus 10 is adapted to operate in a record, or write, mode in which information is recorded on medium 30. As shown in FIG. 1, receiving medium 30 extends in the form of a web between a supply roll 42 and a take-up roll 44. Rolls 42 and 44 can be driven, for example, by a stepper motor (not shown) which is actuated in timed relation to the scan movement of galvanometer 20 to advance the medium 30 in a cross-scan direction. As will be explained hereinafter, apparatus 10 can also be operated in a read mode to check for errors in the information recorded on medium 30 and/or electronically record the image on the medium. A multiwavelength detector 40, located behind the medium, is used in the read mode.

Radiation source 14 can include a laser 43, for example, a diode laser which emits radiation at 830 nm. One suitable laser is a Model SDL-24200H2 laser manufactured by Spectrodiode Laboratories. Source 14 also includes a driver 44 for laser 43 and a frequency doubler device 46 which can be selectively moved into the path of the output beam from diode laser 43. Frequency doubler device 46 is used in the read mode for error detection in a manner to be explained below. Device 46 includes a beam splitter 48 which passes one portion of the beam to a beam equalizer 50 and another portion of the beam to a turning mirror 52. From turning mirror 52, the beam portion passes through a frequency doubler element 54 which produces an output beam at one-half the wavelength of the input beam. The output beam is directed by means of a turning mirror 58 to a dichroic mirror 56 which serves to recombine the two beam portions to form beam 16. The beam 16, which in the read mode for error detection contains wavelengths of 830 nm and 415 nm, is then directed to the galvanometer 20.

The frequency doubler element 54 can be a Model KDP, obtainable from Cleveland Crystal Co., or a lithium niobate device obtainable from the same company. The beam equalizer 50 can be a circular wedge neutral density filter, No. 03FDC003, obtainable from Melles Griot Co. It will be apparent to those skilled in the art that the multiwavelength beam could be produced in other ways, e.g., by combining the beams from two separate sources of radiation or by using a broad-band light source in combination with wavelength selective filters.

The recording medium in the present invention can be any medium which records information in color, for example, films containing thermochromic compounds and mediums in which a color coupler is coverted into a color image dye to record a signal. A preferred recording medium, however, is a film coated with a metastable silver coating, for example, as disclosed in U.S. application, Ser. No. 493,026, entitled "Method of Thermally Forming Images From Metastable Metal Colloids," filed on Mar. 13, 1990 in the names of Gilmour and Shuman; this application is assigned to the assignee of the present invention, and the disclosure in the application is expressly incorporated herein by reference. As disclosed in the Gilmour and Shuman application, a thermal image can be formed on the medium having a blue metastable colloidal silver coating by providing sufficient heat to significantly raise the temperature of the silver layer. In the areas where heat is applied to the blue colloidal silver, the blue is changed to yellow. Such heat can be provided, for example, by a short duration pulse from a diode laser. The background color of the metastable silver need not be blue. Any of a wide variety of colors, including orange and magenta, can be achieved by halting the amplification process employed in forming the metastable silver at an early stage.

As noted above, apparatus 10 can be operated in a read mode. In one read mode, beam 16 would be scanned across medium 30 in the manner described above, and light transmitted through the medium would be sensed to electrically record the image on the medium.

In another read mode, recording errors in the medium 30 can be checked. In this mode, the frequency doubler 46 would be inserted in the optical path, and the beam containing the two wavelengths would be scanned onto the receiving medium 30. Detector 40 would produce signals representing the densities of the two wavelengths to signal processing circuitry 60.

Figure 6:
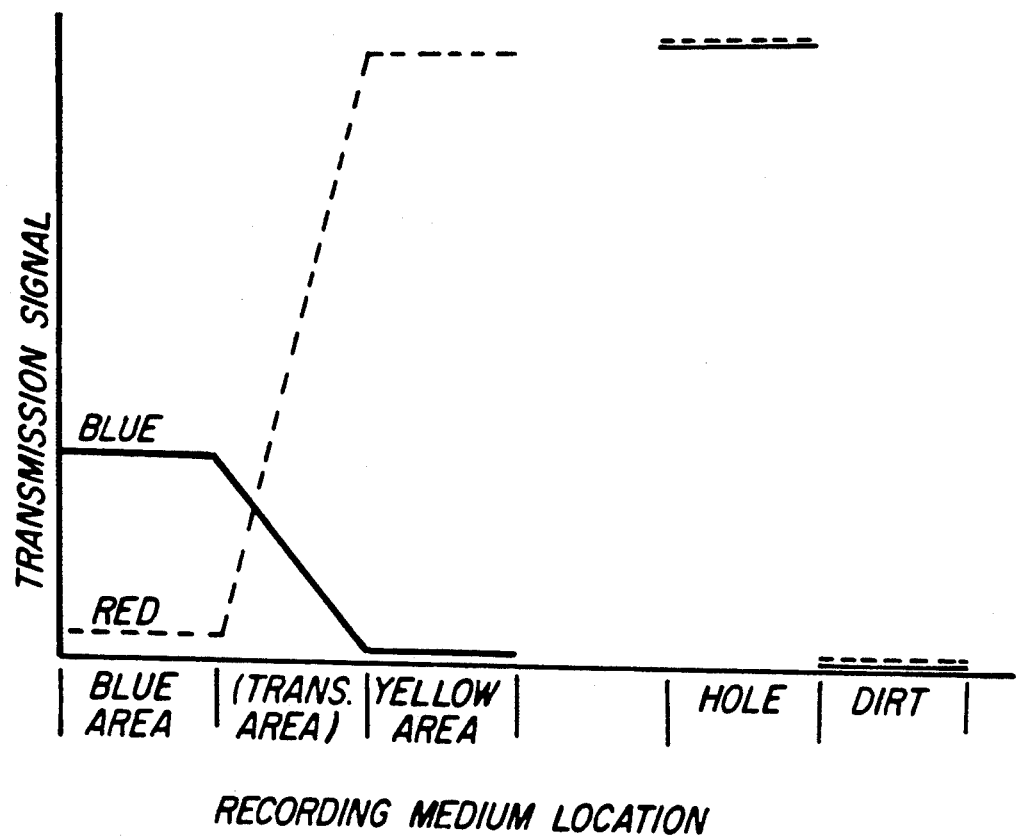
FIG. 6 is a graph showing the signals produced by a two-color medium when read with a two-wavelength source of radiation.

A picture element, or pixel, exposed on the blue colloidal silver will have blue areas and yellow areas. When combinations of blue and yellow fractional areas of a pixel are read, there will be a single-valued relation between the blue and yellow signals. That is, for any yellow value, there will be a corresponding blue value. Further, an increase in one value will be accompanied by a decrease in the other; this relationship is shown graphically in FIG. 6 where the blue value (the blue transmission signal at 415 nm) is represented by the solid line and the yellow value (red transmission signal produced by infrared radiation at 830 nm) is represented by the dotted lines. Any departure from this relationship will indicate the presence of a defect, and it is this characteristic which is used in the present invention to detect errors in information recorded on the medium 30.

In the case of binary images or binary recorded data, a departure from the expected relationship of blue and yellow values can be used to detect errors caused by imperfections in the medium. For example, an opaque area, such as a dirty area, will cause a decrease in both red and blue transmission signals. Conversely, a transparent area, such as a scratch in the film, will cause an increase in both signals. Therefore both of these defects would be detectable. Sufficiently large defects cause both signals to vary in the same direction instead of in opposing directions. Thus, both the presence and nature of a medium defect can be detected. A knowledge of the nature of the defect can enhance EDAC efficiency, thereby saving space on the recording medium as well as reducing the read/write time.

In the case of multilevel images or recorded data, two estimates of pixel exposure can be obtained: one from the blue transmission signal and one from the red transmission signal. The combination of both signals, properly weighted for signal to noise, gives a more accurate estimate than either value alone.

The image of a continuous tone object, whether rendered in continuous or half tone, can be read as a negative or a positive. Reading the "negative" (blue transmission signal decreasing with exposure) with blue light gives the most information in the low-exposure region where the blue density is least. Reading the "positive" (red transmission signal increasing with exposure), the S/N (signal-to-noise ratio) is highest at the high exposures where the red density is least. In fact, the two signals can be combined statistically to yield more information than either signal alone.

Figure 3:
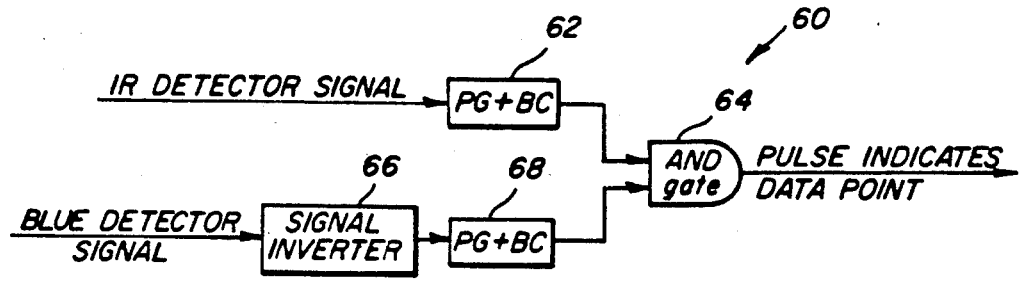
FIG. 3 is a schematic drawing of a signal processing circuit for use in the present invention.

Signals can be processed from detector 40 in accordance with the circuitry 60 shown in FIG. 3. As shown in FIG. 3, a signal from an IR detector (not shown) in detector 40 would be passed to a pulse gate and binary converter 62, and from pulse gate and binary converter 62, a signal would be fed to AND gate 64. A signal from a blue detector (not shown) in detector 40 would pass through a signal inverter 66, a pulse gate and binary converter 68, and then to AND gate 64. A HIGH output from AND gate 64 would indicate a valid data point. The pulse gate and binary converters 62 and 68 can each be a Model No. NE527, made by Signetics Co. The AND gate 64 can be a No. SN74ALS00, obtainable from Texas Instruments Co.

Figure 4:
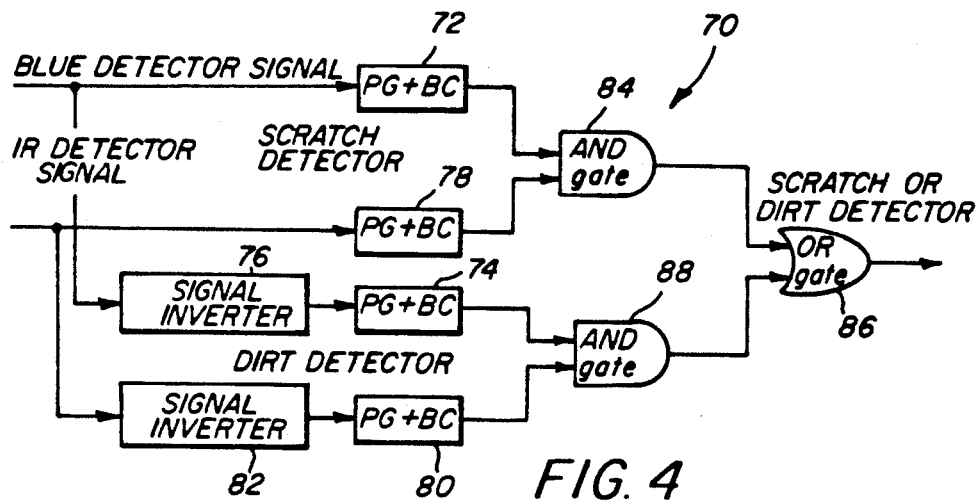
FIG. 4 is a schematic drawing of a signal processing circuit for producing a signal indicative of whether a defect is opaque or transparent.

In FIG. 4, there is shown a circuit 70 for determining whether a defect is the result of a scratch or dirt. In circuit 70, a signal from the blue detector is passed to a pulse gate and binary converter 72 and to another pulse gate and binary converter 74 through a signal inverter 76. Similarly, a signal from the IR detector is passed to a pluse gate and binary converter 78 and to another pulse gate and binary converter 80 through a signal inverter 82. Signals from pulse gate and binary converters 72 and 78 are passed to AND gate 84. A signal from AND gate 84 is fed to OR gate 86. A HIGH output from AND gate 84 would indicate a scratch, since both the blue and IR signals would be high. Signals from pulse gate and binary converters 74 and 80 are fed to AND gate 88, and a High output from AND gate 88 would indicate dirt, since signals from both the blue and IR detectors would be low. A HIGH output from OR gate 86 would indicate that either a scratch or dirt was present on medium 30.

Figure 5:
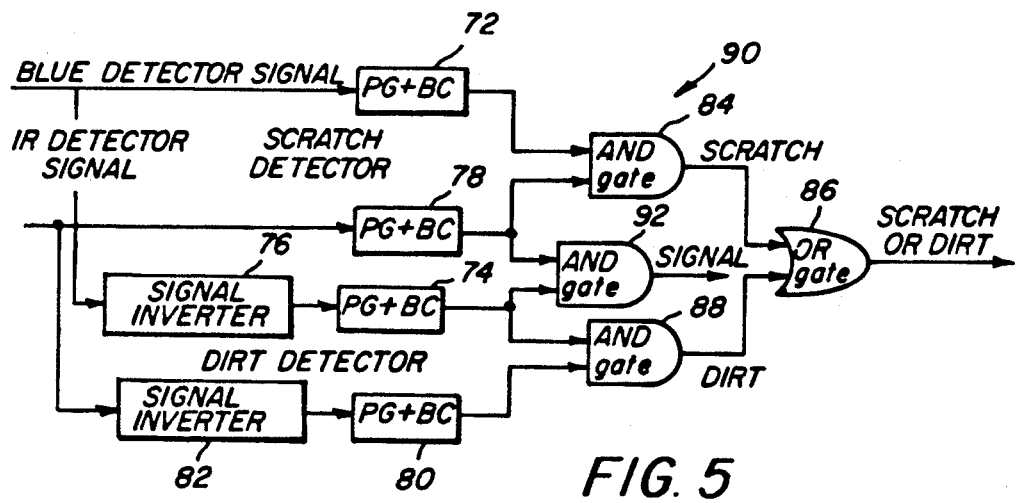
FIG. 5 is a schematic drawing of a signal processing circuit which combines the features of the circuits shown in FIGS. 3 and 4.

A circuit 90 in FIG. 5 functions in the same manner as circuit 70 to indicate when either a scratch or dirt is present. In addition an AND gate 92 receives signals produced in the manner described above for circuit 60 and produces a HIGH output when a valid pixel is present.

This invention has been described in detail with particular reference to the preferred embodiment thereof, but it will be understood that variations and modifications can be effected within the spirit and scope of the invention. For example, although the apparatus has been described herein as operating in a transmission mode, it will be apparent to those skilled in the art that the apparatus could operate in a reflection mode.

We claim:

1. Apparatus for reading an image on an image-bearing medium, said image being formed from a plurality of colors, each pixel in the image containing the colors in a predetermined relationship, said apparatus comprising:
    a source of radiation for directing radiation containing a plurality of wavelengths onto said medium;
    detector means for sensing each of said wavelengths at each pixel of said image and for providing signals representative of the densities of the colors in the pixel; and
    signal processing means for processing the signals from said detector means, said signal processing means including means for determining the relationship of said colors in each of said pixels and for providing an output indicative of whether the information in said pixel is valid and whether the medium at the pixel location is free of defects.

2. Apparatus, as defined in claim 1, wherein said medium is a film coated with blue metastable colloidal silver coating.

3. Apparatus, as defined in claim 1, wherein said source of radiation includes a laser which produces a beam of radiation at one wavelength.

4. Apparatus, as defined in claim 3, wherein said source includes means for producing multiple wavelengths in said beam of radiation.

5. Apparatus, as defined in claim 4, wherein said source includes means for producing wavelengths of 830 nm and 415 nm in said beam of radiation.

6. Apparatus, as defined in claim 1, wherein said detector means includes means for detecting two wavelengths of said plurality of wavelengths in said beam and for producing signals representative of the densities of said two wavelengths in each of said pixels.

7. Apparatus, as defined in claim 6, wherein said detector means includes means for combining the signals representative of said two wavelengths to produce said output indicative of whether the information in the pixel is valid.

8. Apparatus, as defined in claim 1, wherein said signal processing means includes means for indicating the presence of an opaque area on said medium, said opaque area being an area of low radiation transmission that substantially blocks radiation transmission through said medium.

9. Apparatus, as defined in claim 1, wherein said signal-processing means includes means for indicating the presence of a transparent area on said medium, said transparent area being an area substantially void of said plurality of colors.

10. Apparatus for recording and reading an image on a recording medium, said image being formed from a plurality of colors, each pixel in the image containing the colors in a predetermined relationship, said apparatus comprising:
    a source of radiation, said source being adapted to selectively produce radiation on said medium in a single wavelength or in a plurality of wavelengths;
    means for modulating said radiation in accordance with an information signal to produce said image;
    means for directing radiation from said source onto said medium;
    detector means for sensing each of said wavelengths at each pixel of said image and for providing signals representative of the densities of the colors in the pixel; and
    signal processing means for processing the signals from said detector means, said signal processing means including means for determining whether said colors are in said predetermined relationship at each of said pixels and whether there is an opaque area that substantially blocks transmission of radiation through said medium or a transparent area void of said plurality of colors.

* * * * *